United States Patent [19]

Miyasaka

[11] Patent Number: 4,918,680
[45] Date of Patent: Apr. 17, 1990

[54] FOCUS-SERVO CORRECTION UTILIZING STORAGE OF DETECTED FOCUS ERRORS

[75] Inventor: Toshiyuki Miyasaka, Yokohama, Japan

[73] Assignee: Kabushiki Kaisha Toshiba, Kawasaki, Japan

[21] Appl. No.: 229,878

[22] Filed: Aug. 8, 1988

[30] Foreign Application Priority Data

Aug. 14, 1987 [JP] Japan .................................. 62-202856

[51] Int. Cl.⁴ ............................................. G11B 7/00
[52] U.S. Cl. ................................................... 369/45
[58] Field of Search .................... 358/342; 369/32, 33, 369/43-47; 250/201 DF

[56] References Cited

U.S. PATENT DOCUMENTS 4,669,077  5/1987  Gerard et al. ..................... 369/45 X Primary Examiner—Robert L. Richardson
Attorney, Agent, or Firm—Finnegan, Henderson, Farabow, Garrett and Dunner

[57] ABSTRACT

An optical apparatus for focusing a light beam onto a disk medium, includes a motor for rotating the disk medium and an optical element for directing the light beam onto a plurality of sectors defined radially of the disk medium. The optical apparatus further includes a detector for detecting the light beam from the plurality of sectors of the disk medium so as to generate a pluralty of focus-error signals, each representing a distance of the optical element with respect to each of the plurality of sectors of the disk medium, and a memory for storing the plurality of focus-error signals detected from the plurality of the sectors of the disk medium. An adjuster is provided for adjusting the distance of the optical element with respect to each of the plurality of sectors of the disk medium in accordance with the plurality of focus-error signals stored in the memory.

9 Claims, 6 Drawing Sheets

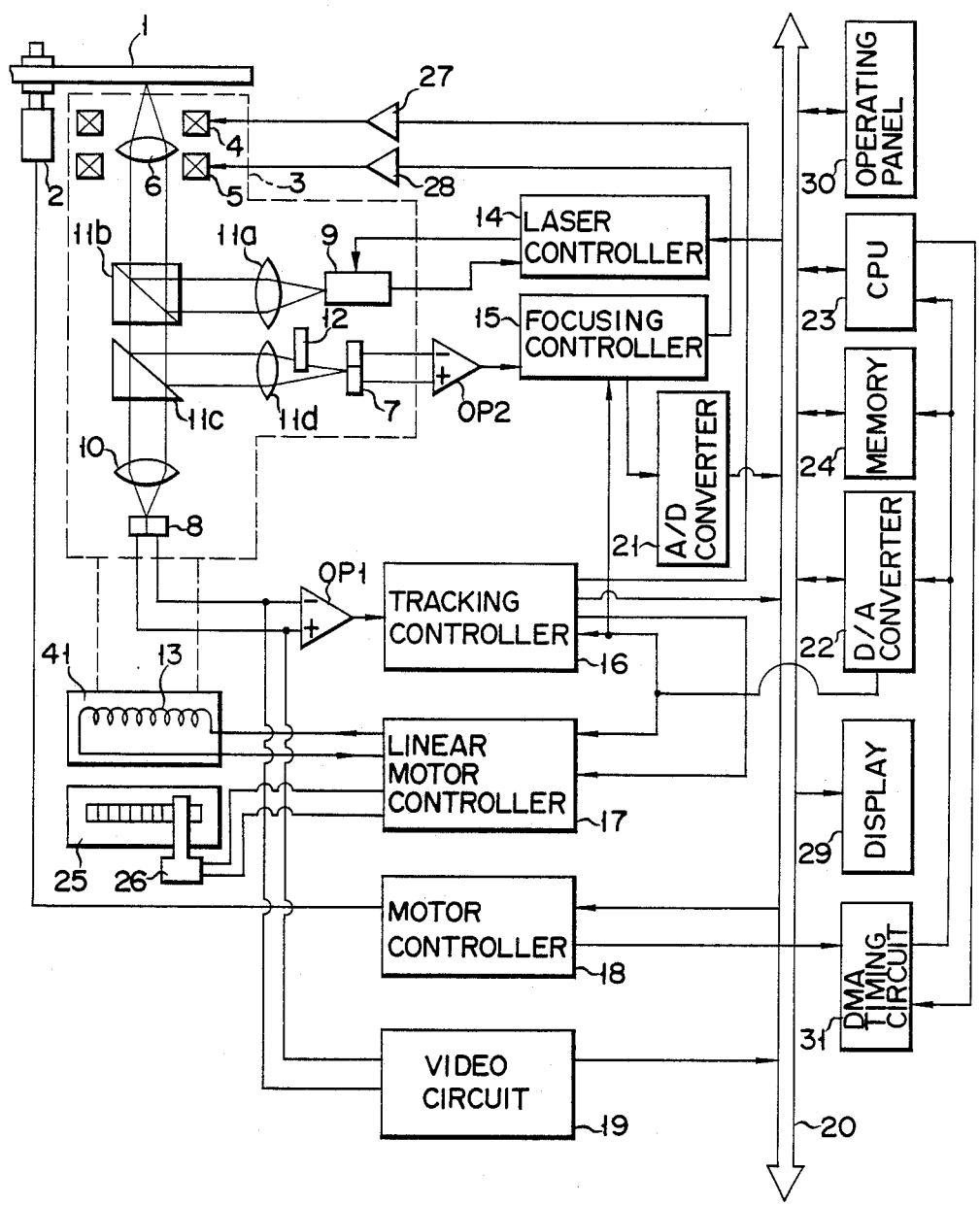
F I G. 1

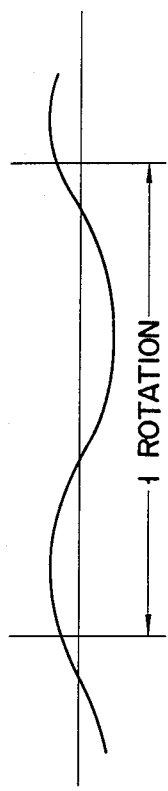
FOCUS-ERROR SIGNAL
F I G. 4A
1 ROTATION
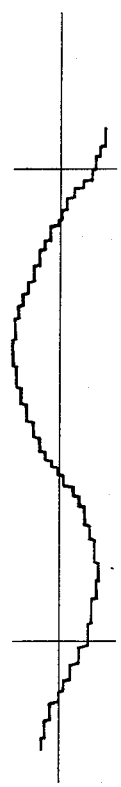
CORRECTION SIGNAL
F I G. 4B
CORRECTED FOCUS-ERROR SIGNAL
F I G. 4C

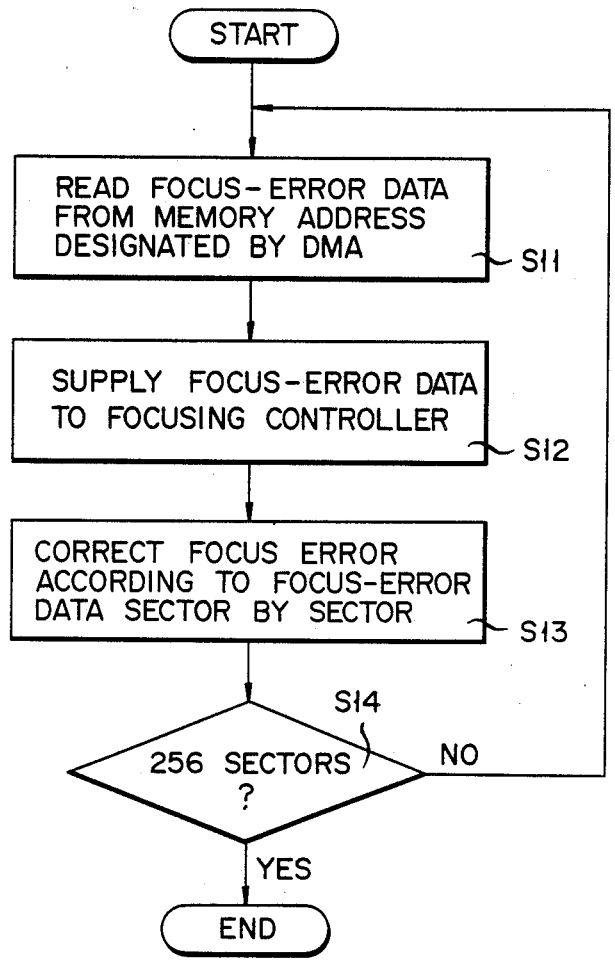
F I G. 5B

FOCUS-SERVO CORRECTION UTILIZING STORAGE OF DETECTED FOCUS ERRORS

BACKGROUND OF THE INVENTION

1. Field of the Invention

The present invention relates to an apparatus for recording/reproducing optical data and a method for the same and, more particularly, to an apparatus and a method capable of performing accurate focus-servo control.

2. Description of the Related Art

Generally, optical disks are used in optical data recording/reproducing apparatus to record data optically. Each optical disk has on its surface a spiral track or concentric tracks. A number of tiny pits are cut in each track. The length of the pits varies in accordance with the kinds of data items the pits represent. The surface of the optical disk is divided into a number of sectors. Addresses are assigned to these sectors. The optical disk comprises a circular substrate made of glass or plastics, and a data-recording layer made of metal such as tellurium or bismuth.

Microscopically speaking, the recording surface of the optical disk is not perfectly flat. It warps by about $\pm 300$ $\mu$m. While the disk is spinning, its surface moves up and down repeatedly. This phenomenon is known as "surface vibration." To record data on, and reproduce it from, the optical disk with high accuracy, a laser beam must be focused exactly on the surface of the optical disk. Due to the surface vibration, the laser beam cannot be correctly focused onto the surface of the disk. In order to compensate for this focus error, an objective lens, through which the laser beam is applied to the disk, is moved in the axial direction of the beam. This operation is called focusservo control.

Focus-servo control techniques are disclosed in "Optical Memory and Optical Magnetic Memory Art Collections", issued by K. K. Science Forum, Section 3, 113–120 (Oct. 1983).

Typically, an apparatus, which performs the focus-servo control, comprises a focus-error detector, an amplifier, and an actuator. The focus-error detector is designed to detect the distance between the surface of an optical disk and the focal point of a laser beam. the amplifier amplifies the signal generated by the detector and representing the said distance. The actuator drives an objective lens in the axial direction of the laser beam in accordance with the signal amplified by the amplifier. The focus-error detector, the amplifier, and the actuator constitute a servo loop. Several methods of detecting the focus error are known. One of these methods is called "knife edge method," which will be explained.

The knife edge method uses a shield which is located at a position where the beam reflected from the optical disk has the smallest diameter, while the focal point is located on the surface of the optical disk. The shield is as thin as the edge of a knife. This is why the method is called "knife edge method." When the laser beam is focused correctly on the surface of the optical disk, the shield does not shield the beam reflected from the disk, and the beam is applied equally to the respective inputs of focus-error detectors, for example, a pair of photosensors, which are arranged besides the shield. Hence, the electric signals output from the photosensors are at the same level. When the distance between the objective lens and the surface of the disk becomes shorter due to the surface vibration of the disk, the shield blocks part of the beam spot, whereby the beam is applied unevenly to the respective inputs of the photosensors. As a result, the electric signals output from the photosensors are at different levels. These electric signals are amplified by an amplifier and input to a subtraction circuit such as a differential amplifier. The subtraction circuit outputs a focus-error signal. The focus-error signal is input to an actuator. The actuator moves the objective lens by a distance in accordance with the amplitude of this signal, so that the laser beam is focused correctly on the surface of the optical disk. In which direction the actuator moves the objective lens is determined in accordance with whether the disk is located nearer to, or farther from, the objective lens than required. More precisely, when the disk surface is nearer to the lens than necessary, the actuator moves the lens away from the disk; when the disk surfaces is farther from the disk surface than required, the actuator moves the lens toward the disk. Since the actuator moves the objective lens this way in accordance with the focus-error signal, the laser beam is correctly focused upon the surface of the optical disk.

The focus-servo control method described above has, however, a drawback in that the servo loop does not have a sufficiently good response. To make matters worse, the gain of the servo loop is liable to change. Therefore, the servo loop cannot function to correct a focus error resulting from a relatively large surface vibration of the optical disk.

SUMMARY OF THE INVENTION

It is accordingly an object of the present invention to provide an apparatus capable of performing accurate focus-servo control.

It is another object of the present invention to provide a method of accurate focus-servo control.

In one aspect of this invention, there is provided an optical apparatus for focusing a light beam onto an object, comprising: means for rotating the object; means for directing the light beam onto a plurality of portions of the object rotated by the rotating means; means for detecting the light beam from the plurality of portions of the object onto which the light beam is directed by the directing means so as to generate a plurality of focus-error signals, each representing a distance of the directing means with respect to each of the plurality of portions of the object onto which the light beam is directed by the directing means; means for storing the plurality of focus-error signals detected from the plurality of the portions of the object by the detecting means; and means for adjusting the distance of the directing means with respect to each of the plurality of portions of the object in accordance with the plurality of focus-error signals stored in the storing means.

In another aspect of the invention, there is provided a method of focusing a light beam onto a disk medium to correct focus erros, comprising the steps of: moving optical pickup means to an innermost track of the disk medium; detecting focus-error signals from the innermost track of the disk medium by the optical pickup means; storing the focus-error signals detected from the innermost track of the disk means as data at memory addresses designated by direct memory-access means; moving the optical pickup means to an outermost track of the disk medium; detecting focus-error signal from the outermost track of the disk medium by the optical pickup means; storing the focus-error signals detected from the outermost track of the disk medium as data at memory addresses designated by the direct memory-access means; and correcting the focus errors according to the focus-error signals stored at the memory addresses designated by the direct memory-access means.

BRIEF DESCRIPTION OF THE DRAWINGS

The foregoing aspects and other features of the invention will be explained in the following description taken in conjunction with the accompanying drawings, wherein:

FIG. 1 is a block diagram showing an optical recording/reproducing apparatus comprising a focus-servo control apparatus according to the invention;

FIGS. 4A, 4B, and 4C are waveform charts, corresponding to a focus-error signal, a correction signal, and a corrected focus-error signal respectively; and FIGS. 5A and 5B are flowcharts explaining how focus-error signals resulting from the surface vibration of an optical disk are corrected.

DETAILED DESCRIPTION OF THE PREFERRED EMBODIMENT

One embodiment of the present invention will now be described in detail, with reference to the accompanying drawings.

FIG. 1 is a schematic representation of an optical recording/reproducing apparatus which includes a focus-servo control apparatus according to the invention.

Figure 2:
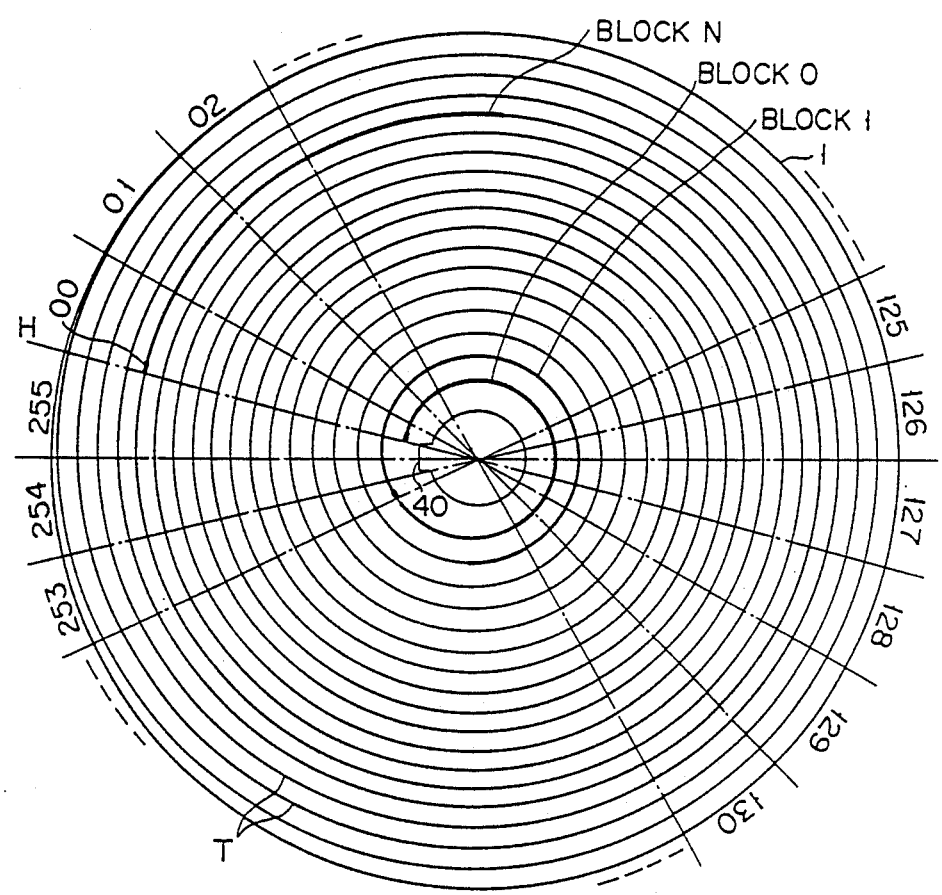
FIG. 2 shows a disk surface on which data in the form of pits is recorded.

Optical disk 1 is used in the optical recording/reproducing apparatus as a recording medium. This disk 1 comprises a substrate made of glass or plastics, and a recording layer coated on the substrate and made of a metal such as tellurium or bismuth. As shown in FIG. 2, the recording layer has a notch 40 cut in its center portion. The notch 40 serves as a mark representing the reference position of optical disk 1.

The recoridng surface of optical disk 1 consists of 256 sectors defined radially thereof. Sector addresses 0 to 255 are assigned to these sectors. The innermost end of the sector having address 0 corresponds to the reference-position mark 40. At most 36,000 concentric tracks T are formed on the recording surface of optical disk 1. Each track consists of a number of pits formed in the surface of disk 1. Each of these pits is elongated, and its length differs in accordance with the type of data it represents. Each track is divided into as many as 300,000 blocks. Each block consists of a block header and a data-recording portion. The block number, the track number, and similar data items are recorded in the block header, either before or after optical disk 1 is delivered from the manufacturer to the user.

Optical disk 1 is rotated by means of dc motor 2. Motor 2 is controlled by controller 18.

Data is reproduced from optical disk 1 by means of optical pickup 3. Optical scale 25 is attached to optical pickup 3. Thus, when optical pickup 3 moves in the radial direction of optical disk 1, scale 25 is moved in the same direction for the same distance. Position detector 26 is fixed close to optical scale 25 and connected to linear-motor controller 17. Detector 26 generates an electric signal representing the distance scale 25 has moved, and supplies this signal to linear-motor controller 17. In accordance with the signal, controller 17 controls linear motor 41. Linear motor 41 comprises a fixed section and a movable section. The fixed section includes a permanent magnet (not shown), and the movable section has drive coil 13. Motor 41 moves optical pickup 3 in the radial direction of optical disk 1 under the control of linear-motor controller 17.

Optical pickup 3 comprises drive coils 4 and 5, and objective lens 6, semiconductor laser 9. Objective lens 6 is supported by a leaf spring (not shown), such that it can be moved by drive coil 5 in its axial direction (hereinafter referred to as focusing direction), and also by drive coil 4 in the direction at right angles to the focusing direction (hereinafter referred to as tracking direction). Semiconductor laser 9 is driven by laser controller 14 located outside optical pickup 3.

Optical pickup 3 further comprises two pairs of photosensors 7 and 8, focusing lens 10, collimator lens 11a, beam splitter 11b, half-prism 11c, focusing lens 11d, and knife edge 12. The laser beam emitted by semiconductor laser 9 is applied to the recording surface of disk 1 through collimator lens 11a, beam splitter 11b, and objective lens 6. The light beam reflected from the recording surface of disk 1 is guided to halfprism 11c via objective lens 6 and beam splitter 11b. Half-prism 11c divides the reflected beam into two components. The first component of the reflected beam is applied to photosensors 8 via focusing lens 10, whereas the second component of the reflected beam is applied to photosensors 7 through focusing lens 11d and knife edge 12.

Upon receipt of the first component of the reflected beam, photosensors 8 output two electric signals. These signals are output to operational amplifier OP1. Amplifier OP1 generates a track-difference signal by subtracting one of the two signals from the other. The track-difference signal is supplied to tracking controller 16. Controller 16 outputs a tracking control signal to drive coil 4 via amplifier 27. Tracking control signal energizes drive coil 4, which drives objective lens 6 for tracking-servo control. The tracking control signal is also supplied to linear-motor controller 17.

Upon receipt of the second component of the reflected beam, photosensors 7 output two signals representing the position at which the laser beam is focused. These signals are supplied to operational amplifier OP2. Operational amplifier OP2 generates a focus-error signal by subtracting one of the two signals from the other. The focus-error signal is supplied to focusing controller 15. Focusing controller 15 applies a voltage corresponding to the focus-error signal, to drive coil 5 through amplifier 28. In accordance with this voltage, drive coil 5 focuses the laser beam on the desired position on the recording surface of optical disk 1.

The two signals output by photosensors 8 are also input to video circuit 19, as signals reproduced from optical disk 1. Viedo circuit 19 serves to reproduce these signals. The reproduced signals can be displayed by display 29.

Laser controller 14, focusing controller 15, tracking controller 16, linear-motor controller 17, motor controller 18, and video circuit 19 are connected to CPU 23 by bus line 20, and are controlled by CPU 23. CPU 23 executes the program stored in memory 24 in accordance with the instructions input through operating panel 30 connected to bus line 20.

A/D converter 21 is connected between focusing controller 15 and bus line 20, and D/A converter 22 is connected to bus line 20. A/D converter 21 is used to perform the exchange of data between focusing controller 15 and CPU 23. D/A converter 22 is employed to perform the exchange of data between tracking controller 16 and linear-motor controller 17, on the one hand, and the CPU 23, on the other hand.

Figure 3:
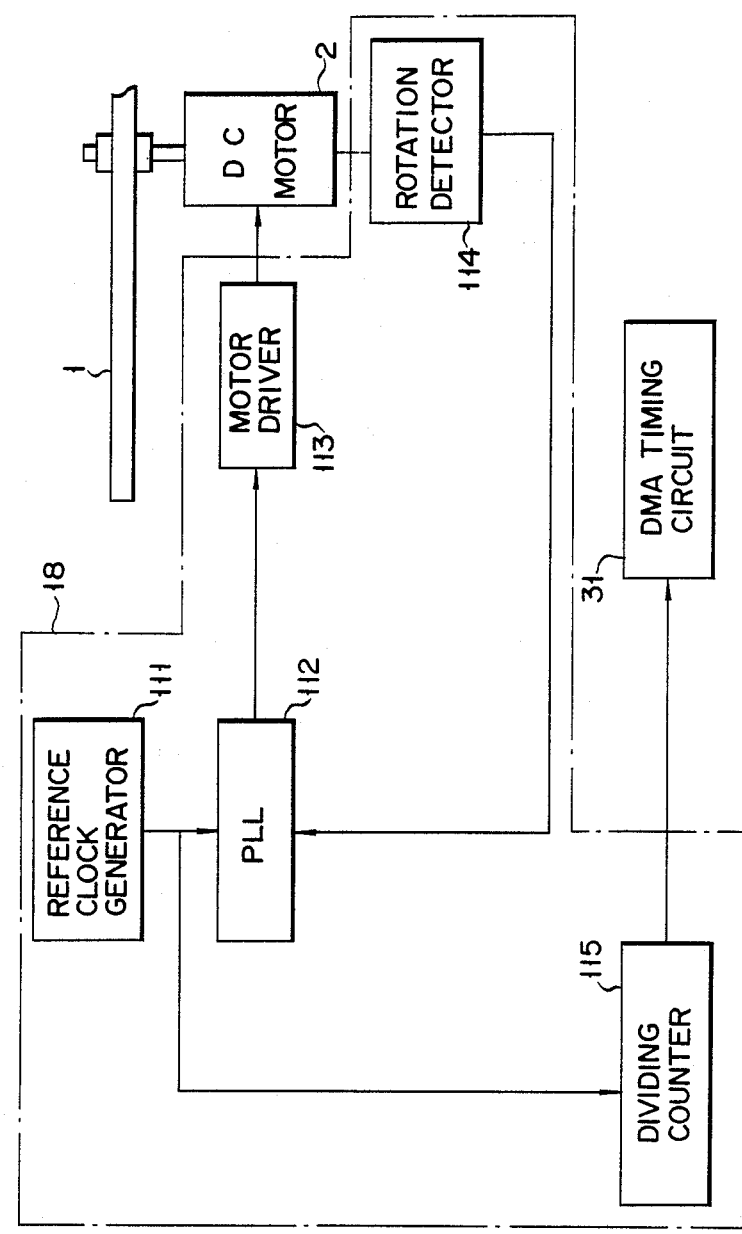
FIG. 3 is a block diagram showing the motor control circuit used in the focus-servo control apparatus according to the present invention.

FIG. 3 is a block diagram showing motor controller 18 used for achieving focus-servo control. As is shown in this figure, motor controller 18 comprises clock generator 111, PLL (phase-lockedloop) 112, motor driver 113, rotation detector 114, and dividing counter 115. Clock generator 111 generates a reference clock signal. This clock signal drives dc motor 2. Rotation detector 114 detects the rotation of dc motor 2, and generates an electric signal which has the frequency representative of the speed of rotation of dc motor 2. This electric signal is input to PLL 112. PLL 112 compare the frequency of this signal with that of the clock signal output by clock generator 111, and generates a signal representing the difference in frequency between the compared signals. The output signal of PLL 112 is supplied to motor driver 113. In accordance with the output signal, motor driver 113 controls dc motor 2 such that the speed of motor 2 is changed to compensate a frequency difference, if any, between output signals of clock generator 111 and rotation detector 114.

In the meantime, the clock signal output by clock generator 111 is input to dividing counter 115. Dividing counter 115 divides the frequency of the clock signal, thereby producing 256 clock pulses every time optical disk 1 rotates 360°. This specific number of clock pulses is equal to the number of sectors which disk 1 has. The clock pulses output by dividing counter 115 are supplied to DMA (Direct Memory Access) timing circuit 31 which is connected to CPU 23. The sampled address of memory 24 is set in DMA timing circuit 31, as the initial value. Every time circuit 31 receives one pulse from dividing counter 115, it adds one to the initial address value. The address value, thus incremented, is input to memory 24 as a timing signal. This address value is cyclic; it is initialized when optical disk 1 starts rotating for every time. Since DMA timing circuit 31 operates in accordance with reference clock signal used to drive dc motor 2, its output signal, i.e., the timing, undergoes no phase shift at all.

Figure 5A:
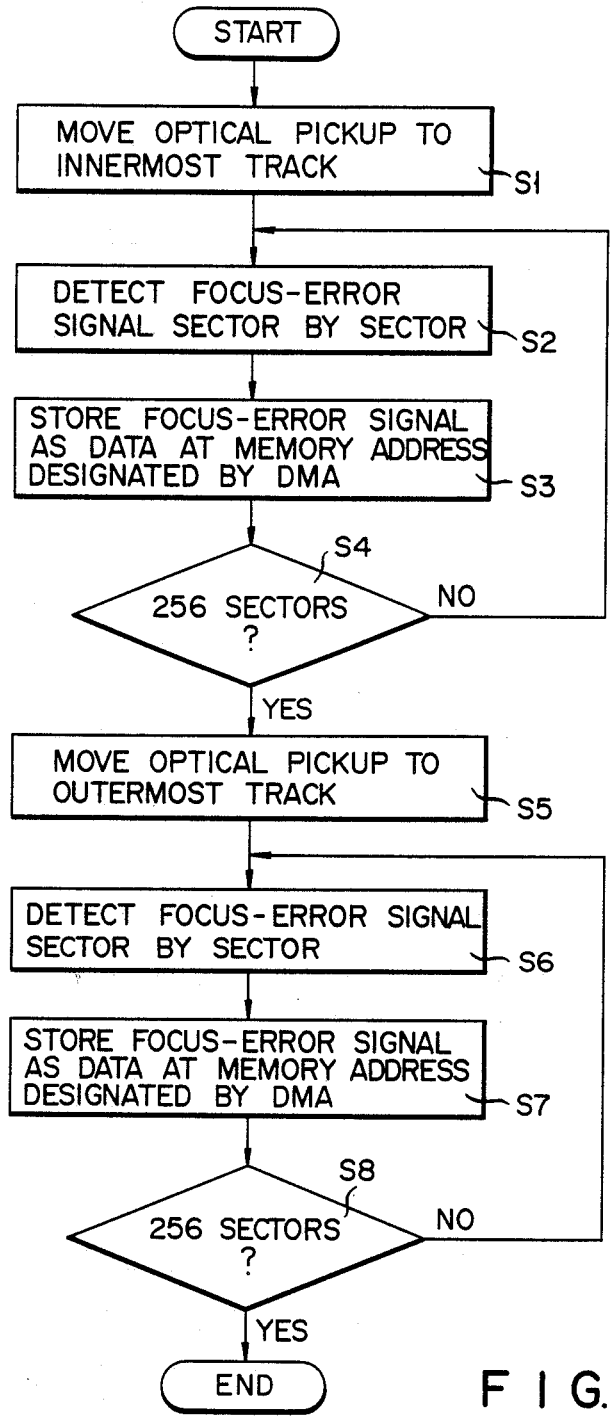

It will now be explained how a focus error resulting from the surface vibration of optical disk 1 is correct referring to the flowcharts of FIGS. 5A and 5B.

Prior to recordation or reproduction, CPU 23 supplies a predetermined signal to motor controller 18. In accordance with this signal, controller 18 drives dc motor 2, thereby rotating optical disk 1. Further, CPU 23 supplies another signal to linear-motor controller 17. In accordance with this signal, linear-motor controller 17 drives linear motor 41, whereby optical pickup 3 is positioned at a sector position on the innermost track of disk 1 (Step 1).

Then, CPU 23 supplies a signal to laser controller 14. In accordance with this signal, controller 14 drives semiconductor laser 9. Hence, semiconductor laser 9 emits a data-reproducing beam. The beam is applied to focusing lens 6 via collimator lens 11a and beam splitter 11b. Focusing lens 6 focuses the beam onto the innerost track of optical disk 1.

Since optical disk 1 is rotating, dividing counter 115 of motor controller 18 generates and supplies clock pulses to DMA timing circuit 31.

The light beam reflected from the innermost track of optical disk 1 is guided to photosensors 7 via focusing lens 6, beam splitter 11b, half-prism 11c, focusing lens 11d, and knife edge 12. Sensors 7 output two electric signals. These signals are input to operational amplifier OP2. Amplifier OP2 outputs a signal relating to a focus error by subtracting one signal of the two signals from the other. That is, a focuc-error signal is detected (Step 2). This focus-error signal is input to CPU 23 through focusing controller 15, A/D converter 21, and data bus 20.

CPU 23 stores the focus-error signal into memory 24, at the address designated by the address value supplied from DMA timing circuit 31 (Step 3). More precisely, CPU 23 stores the voltage value (in the form of a voltage), which corresponds to the focus-error signal, in the address assigned to that sector of disk 1 on which the laser beam is being applied until CPU 23 identifies 256 sectors (Step 4). Hence, every time optical disk 1 rotates 360°, 256 data items representing focus errors, which have resulted from the surface vibration of the innermost track and which are related to 256 sectors, are stored into memory 24.

Thereafter, linear-motor controller 17 drives drive coil 13, thereby moving optical pickup 3 from the innermost track to a sector position on the outermost track of optical disk 1 (Step 5). Then, CPU 23 performs the same sequence of operations as it has carried out while optical pickup 3 is located right above the innermost track. That is, focus-error signals are detected (Step 6) and stored at memory addresses designated by DMA (Step 7) until CPU 23 identifies 256 sectors (Step 8). As a result of this, 256 data items representing focus errors, which have resulted from the surface vibration of the outermost track and which are related to 256 sectors, are stored into memory 24 prior to recordation or reproduction of data. As is generally known, these focus errors are greater than those produced from the light beams reflected from the innermost track of disk 1.

When data is recorded or reproduced, CPU 23 reads the focus-error data items, which represent the errors due to the surface vibrations of the innermost and outermost tracks of disk 1, sequentially from these addresses of memory 24 which have been designated by the address values supplied from DMA timing circuit 31 (Step 11). Each of these data items are read out in the form of an electric signal. The polarity of this electric signal is reversed. The signal is then supplied to focusing controller 15 (Step 12) via D/A converter 22, and cancels out the focus-error signal. In this way, focus errors are corrected sector by sector (Step 13) until 256 data are supplied to focusing controller 15 (Step 14).

FIGS. 4A, 4B, and 4C are waveform diagrams, explaining how each focus-error signal is processed to correct the focus error. More specifically, FIG. 4A shows the waveform of a focus-error signal generated while optical disk 1 is rotating one time. FIG. 4B represents the waveform of a focus-error correction signal output by reversing the polarity of the focus-error signal shown in FIG. 4A. The correction signal (FIG. 4B) is supplied to focusing controller 15 through D/A converter 22. Controller 15 supplies drive coil 6 with a current corresponding to the correction signal, i.e., a bias voltage. Hence, coil 5 moves objective lens 6 so as to focus the laser beam correctly on optical disk 1, despite the surface vibration of spinnig disk 1. More precisely, when the recording surface of disk 1 is too close to focusing lens 6, drive coil 5 moves lens 6 away from the recording surface until the laser beam is focused on the recording surface; conversely, when the recording surface of disk 1 is too far from focusing lens 6, drive coil 5 moves lens 6 toward the recording surface until the beam is focused on the recording surface. As a result, operational amplifier OP2 generates a focus-error signal which has the waveform illustrated in FIG. 4C.

As has been described above, according to this invention, a focus-error signal (i.e., data items showing the displacements of the surface of disk 1 from focusing lens 6) is stored into memory 24 before data is recorded on, or reproduced from, disk 1. During the data-recording operation or the data-reproducing operation, an error correction signal, which has been obtained by reversing the polarity of the focus-error signal, is supplied as a bias voltage to drive coil 5, thereby moving lens 6 such that lens 6 focuses the laser beam correctly on the recording surface of optical disk 1.

Therefore, the focus error (i.e., the surface vibration of the optical disk) is eliminated, however great it is, thus ensuring an accurate focus-servo control of both the data-recording beam and the datareproducing beam. Since the focus error is detected from both the light beam reflected from the innermost track and the light beam reflected from the outermost track, the data-recording beam and the data-reproducing beam can be focused more correctly than otherwise.

In the embodiment described above, the focus error is detected from two tracks of the optical disk. Nonetheless, the error can be detected from three or more tracks, thereby to accomplish a more accurate focus-servo control in an optical data recording/ reproducing apparatus.

What is claimed is:

1. An optical apparatus for focusing a light beam onto an object, comprising:
   means for rotating the object;
   means for directing the light beam onto a plurality of portioons of the object rotated by the rotating means;
   means for detecting the light beam from the plurality of portions of the object onto which the light beam is directed by the directing means so as to generate a plurality of focus-error signals, each representing a distance of the directing means with respect to each of the plurality of portions of the object onto which the light beam is directed by the directing means;
   means for storing the plurality of focus-error signals detected from the plurality of the portions of the object by the detecting means; and
   means for adjusting the distance of the directing means with respect to each of the plurality of portions of the object in accordance with the plurality of focus-error signals stored in the storing means.

2. The optical apparatus according to claim 1, further comprising direct memory-access means for designating memory addresses at which the plurality of focus-error signals are stored.

3. An optical apparatus for focusing a light beam onto a disk medium, comprising:
   means for rotating the disk medium;
   means for directing the light beam onto a plurality of sectors defined radially of the disk medium rotated by the rotating means;
   means for detecting the light beam from the plurality of sectors of the disk medium onto which the light beam is directed by the directing means soas to generate a plurality of focus-error signals, each representing a distance of the directing means with respect to each of the plurality of sectors of the disk medium onto which the light beam is directed by the directing means;
   means for storing the plurality of focus-error signals detected from the plurality of the sectors of the disk medium by the detecting means; and
   means for adjusting the distance of the directing means with respect to each of the plurality of sectors of the disk medium in accordance with the plurality of focus-error signals stored in the storing means.

4. The optical apparatus according to claim 3, further comprising direct memory-access means for designating memory addresses at which the plurality of focus-error signals are stored.

5. The optical apparatus according to claim 3, wherein the detecting means detects the light beam from the plurality of sectors located at an innermost portion of the disk medium.

6. The optical apparatus according to claim 3, wherein the detecting means detects the light beam from the plurality of sectors located at an outermost portion of the disk medium.

7. A method of focusing a light beam onto a disk medium to correct focus errors, comprising the steps of:
   moving optical pickup means to an innermost track of the disk medium;
   detecting focus-error signals from the innermost track of the disk medium by the optical pickup means;
   storing the focus-error signals detected from the innermost track of the disk means as data at memory addresses designated by direct memory-access means;
   moving the optical pickup means to an outermost track of the disk medium;
   detecting focus-error signals from the outermost track of the disk medium by the optical pickup means;
   storing the focus-error signals detected from the outermost track of the disk medium as data at memory addresses designated by the direct memory-access means; and
   correcting the focus errors according to the focuserror signals stored at the memory address designated by the direct memory-access means.

8. The method according to claim 7, wherein the optical pickup means detects the light beam from the plurality of sectors located at an innermost portion of the disk medium.

9. The method according to claim 7, wherein the optical pickup means detects the light beam from the plurality of sectors located at an outermost portion of the disk medium.

* * * * *